United States Patent
Gu et al.

(10) Patent No.: US 12,412,957 B2
(45) Date of Patent: *Sep. 9, 2025

(54) AQUEOUS COATING COMPOSITION INCLUDING POLY(VINLAMIDE)-BASED COPOLYMER, CROSSLINKING AGENT, AND INORGANIC PARTICLES, METHOD FOR MANUFACTURING SEPARATOR BY USING SAME, SEPARATOR, AND LITHIUM BATTERY

(71) Applicant: SAMSUNG SDI CO., LTD., Yongin-si (KR)

(72) Inventors: Jayeon Gu, Yongin-si (KR); Hana Kim, Yongin-si (KR); Byungmin Lee, Yongin-si (KR); Minho Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/013,588

(22) PCT Filed: May 13, 2022

(86) PCT No.: PCT/KR2022/095099
§ 371 (c)(1),
(2) Date: Nov. 20, 2023

(87) PCT Pub. No.: WO2022/240275
PCT Pub. Date: Nov. 17, 2022

(65) Prior Publication Data
US 2024/0250384 A1    Jul. 25, 2024

(30) Foreign Application Priority Data

May 14, 2021  (KR) .................... 10-2021-0062752

(51) Int. Cl.
*H01M 50/446* (2021.01)
*H01M 10/052* (2010.01)
(Continued)

(52) U.S. Cl.
CPC ....... *H01M 50/446* (2021.01); *H01M 10/052* (2013.01); *H01M 50/403* (2021.01); *H01M 50/449* (2021.01); *H01M 50/491* (2021.01)

(58) Field of Classification Search
CPC ............ H01M 50/446; H01M 50/403; H01M 50/491; H01M 50/449
(Continued)

(56) References Cited

U.S. PATENT DOCUMENTS 6,306,545 B1   10/2001  Carlson et al.
8,372,475 B2    2/2013  Kim et al.
(Continued)

FOREIGN PATENT DOCUMENTS

EP      3831859 A1   6/2021
JP   2007-035541 A   2/2007
(Continued)

OTHER PUBLICATIONS

International Search Report dated Aug. 22, 2022, PCT Patent Application No. PCT/KR2022/095099.
(Continued)

*Primary Examiner* — Sean P Cullen
(74) *Attorney, Agent, or Firm* — Lee IP Law, P.C.

(57) ABSTRACT

Provided are a separator coating composition, a method of manufacturing a separator using the same, and a separator and a lithium battery using the same. The separator coating composition includes a binder containing an aqueous crosslinking reactive poly(vinylamide)-based copolymer, a crosslinking agent having at least bifunctionality, inorganic particles, and water, wherein the poly(vinylamide)-based (Continued)

copolymer includes a repeating unit derived from a vinyl-amide monomer and a repeating unit derived from a cross-linking reactive group-containing monomer. The separator coating composition may be used to prepare a separator capable of exhibiting high heat resistance even at a thinner coating thickness.

15 Claims, 2 Drawing Sheets

(51) Int. Cl.
*H01M 50/403* (2021.01)
*H01M 50/449* (2021.01)
*H01M 50/491* (2021.01)

(58) Field of Classification Search
USPC .................................. 429/144, 251, 254
See application file for complete search history.

(56) References Cited

U.S. PATENT DOCUMENTS

| | | |
|---|---|---|
| 9,180,412 B2 | 11/2015 | Jo et al. |
| 9,508,974 B2 | 11/2016 | Lee et al. |
| 10,059,085 B2 | 8/2018 | Okugawa et al. |
| 10,205,147 B2 | 2/2019 | Park et al. |
| 10,468,652 B2 | 11/2019 | Jang et al. |
| 10,586,969 B2 | 3/2020 | Sung et al. |
| 2013/0252066 A1 | 9/2013 | Yeou et al. |
| 2016/0204409 A1* | 7/2016 | Jeon .................... H01M 50/489 |
| | | 429/145 |
| 2018/0019457 A1* | 1/2018 | Alharizah ........... H01M 50/491 |
| 2019/0237732 A1 | 8/2019 | Hu et al. |
| 2020/0411826 A1 | 12/2020 | Lee et al. |
| 2024/0222790 A1* | 7/2024 | Cho .................... H01M 50/443 |

FOREIGN PATENT DOCUMENTS

| | | | | |
|---|---|---|---|---|
| JP | 4426721 B2 | 12/2009 | | |
| JP | 2019-525439 A | 9/2019 | | |
| KR | 10-1117126 B1 | 2/2012 | | |
| KR | 10-1125013 B1 | 3/2012 | | |
| KR | 2012018686 A * | 3/2012 | ............ | G10L 25/48 |
| KR | 10-2012-0108686 A | 10/2012 | | |
| KR | 10-1256968 B1 | 4/2013 | | |
| KR | 10-1288650 B1 | 7/2013 | | |
| KR | 10-2013-0107550 A | 10/2013 | | |
| KR | 10-1491059 B1 | 2/2015 | | |
| KR | 10-1551757 B1 | 9/2015 | | |
| KR | 10-1749878 B1 | 6/2017 | | |
| KR | 10-2017-0108063 A | 9/2017 | | |
| KR | 2017108063 A * | 9/2017 | ............ | C04B 14/02 |
| KR | 10-1989533 B1 | 6/2019 | | |
| KR | 10-2018299 B1 | 11/2019 | | |
| KR | 10-2072763 B1 | 3/2020 | | |
| KR | 10-2021-0030374 A | 3/2021 | | |
| WO | WO-2015046126 A1 * | 4/2015 | ............ | H01M 2/166 |

OTHER PUBLICATIONS

Korean Office Action dated May 28, 2024, of the corresponding Korean Patent Application No. 10-2021-0062752.
Provisional double patenting rejection over claims of the above-identified application; USPTO Office action mailed Sep. 17, 2024, in U.S. Appl. No. 18/013,715.
Provisional double patenting rejection over claims of the above-identified application; USPTO Office action mailed Jan. 6, 2025, in U.S. Appl. No. 18/013,715.

* cited by examiner

AQUEOUS COATING COMPOSITION INCLUDING POLY(VINLAMIDE)-BASED COPOLYMER, CROSSLINKING AGENT, AND INORGANIC PARTICLES, METHOD FOR MANUFACTURING SEPARATOR BY USING SAME, SEPARATOR, AND LITHIUM BATTERY

CROSS REFERENCE TO RELATED APPLICATIONS

This is the U.S. national phase application of PCT/KR2022/095099 filed on May 13, 2022, which is based on Korean Patent Application No. 10-2021-0062752 filed on May 14, 2021, the entire contents of all of which are hereby incorporated by reference.

TECHNICAL FIELD

The disclosure relates to a separator coating composition, a method of manufacturing a separator using the same, and a separator and a lithium battery using the same.

BACKGROUND ART

In order to meet the miniaturization and high performance of various devices, the demand for miniaturization and weight reduction of lithium batteries is increasing. In addition, the importance of discharge capacity, energy density and cycle characteristics of lithium batteries is increasing for application in fields such as electric vehicles. To meet the purpose described above, there is a demand for a lithium battery having high discharge capacity per unit volume, high energy density, and excellent lifespan characteristics.

A separator is disposed to prevent a short circuit between a positive electrode and a negative electrode in a lithium battery. An electrode assembly including a positive electrode, a negative electrode, and a separator disposed between the positive electrode and the negative electrode is wound to have a jelly roll shape, and the jelly roll is pressed to improve adhesion between the positive electrode/negative electrode and the separator in the electrode assembly.

Olefin-based polymers are widely used as separators for lithium batteries. Olefin-based polymers have excellent flexibility. However, they have low strength in the case where immersed in an electrolyte solution, and may cause a short circuit of a battery due to rapid thermal contraction at a high temperature of 100° C. or higher. In order to solve this problem, for example, a separator having a shutdown function added by using polyethylene wax on a porous olefin-based polymer substrate has been proposed. However, the polyethylene wax-coated separator does not retain the coating layer because the polyethylene wax dissolves at a high temperature, such that the contact surface thereof with respect to the electrode plate is increased and thermal runaway is increased.

Therefore, a separator capable of improving battery stability at high temperatures is required.

DESCRIPTION OF EMBODIMENTS

Technical Problem

One aspect is to provide a separator coating composition having high heat resistance.

Another aspect is to provide a method of manufacturing a separator using the composition.

Another aspect is to provide a separator manufactured by the manufacturing method.

Another aspect is to provide a lithium battery including the separator.

Solution to Problem

According to one aspect, provided is a composition for coating a separator, the composition including:
a binder including an aqueous crosslinking reactive poly(vinylamide)-based copolymer; a multifunctional crosslinking agent having at least bifunctionality; inorganic particles; and water, wherein
the poly(vinylamide)-based copolymer includes a repeating unit derived from a vinylamide monomer and a repeating unit derived from a crosslinking reactive group-containing monomer.

According to another aspect, there is provided a method of manufacturing a separator, the method including:
coating the separator coating composition on one surface or opposite surfaces of the porous substrate; and
drying, with hot air, the porous substrate coated with the composition thereon to obtain a separator in which a coating layer is disposed on the porous substrate.

According to still another aspect, there is provided a separator including:
a porous substrate; and
a coating layer which includes a dry cross-linked product of the separator coating composition and is disposed on one surface or opposite surfaces of the porous substrate.

According to another aspect, provided is a lithium battery including the separator.

Advantageous Effects of Disclosure

A separator coating composition according to one aspect may provide a separator having high heat resistance.

BEST MODE

The present disclosure will now be described more fully with reference to the accompanying drawings, in which example embodiments are shown. The present disclosure may, however, be embodied in many different forms, should not be construed as being limited to the embodiments set forth herein, and should be construed as including all modifications, equivalents, and alternatives within the scope of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprise," "include," and/or "have," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

The term "monomer" used herein refers to a monomer that can be polymerized with another polymerizable component, such as other monomers or a polymer. It is to be understood that, unless otherwise indicated, once a monomeric component reacts with another component to form a compound, the compound would contain residues of such component.

The term "polymer" used herein is intended to refer to prepolymers, oligomers, homopolymers, copolymers, and blends or mixtures thereof.

The term "combination thereof" refers to a mixture, a copolymer, a blend, an alloy, a composite, a reaction product of constituents.

Hereinafter, a composition for coating a separator, a method of manufacturing a separator using the same, a separator, and a lithium battery using the same, according to exemplary embodiments, will be described in more detail.

A composition for coating a separator according to an embodiment includes:
a binder including an aqueous crosslinking reactive poly (vinylamide)-based copolymer; a multifunctional crosslinking agent having at least bifunctionality; inorganic particles; and water, wherein
the poly(vinylamide)-based copolymer includes a repeating unit derived from a vinylamide monomer and a repeating unit derived from a crosslinking reactive group-containing monomer.

The separator coating composition is coated on one surface or opposite surfaces of a porous substrate to provide a separator having a coating layer formed thereon. By using the separator coating composition, a separator having higher heat resistance than conventional separators may be obtained. A separator manufactured using this may improve lifespan characteristics of a lithium battery.

The separator coating composition includes, as a binder, a binder containing an aqueous crosslinking reactive poly (vinylamide)-based copolymer; a multifunctional crosslinking agent having at least bifunctionality; inorganic particles; and water, wherein the poly(vinylamide)-based copolymer includes a repeating unit derived from a vinylamide monomer and a repeating unit derived from a crosslinking reactive group-containing monomer. The separator coating composition may form a network chain by causing a crosslinking reaction between repeating units derived from a crosslinking reactive group-containing monomer in a poly(vinylamide)-based copolymer by a multifunctional crosslinking agent having at least bifunctionality, thereby forming a crosslinked polymer having a network structure. In the case where a separator coating layer is formed using the separator coating composition, a separator having higher heat resistance than conventional separators can be provided through the formation of a coating layer containing a polymer having a network structure. In addition, through the formation of a coating layer containing a polymer of a network structure, high heat resistance can be exhibited even at a thinner thickness than a coating separator that does not have a network structure.

In some embodiments, the vinylamide monomer may be selected from vinylpyrrolidone, vinylcaprolactam, N-vinylformamide, N-vinylacetamide, N-vinyl-N-methylacetamide, and mixtures thereof. For example, the vinylamide monomer may be vinylpyrrolidone.

In some embodiments, the crosslinking reactive group may include at least one selected from a carboxyl group, an amine group, an isocyanate group, a hydroxyl group, an epoxy group, and an oxazoline group. For example, the crosslinking reactive group may include a carboxyl group.

The crosslinking reactive group-containing monomer may be a carboxyl group-containing monomer. An example thereof may be a carboxylic acid selected from an acrylic acid, a methacrylic acid, carboxyethyl acrylate, carboxypentyl acrylate, an itaconic acid, a maleic acid, a fumaric acid, a crotonic acid, an isocrotonic acid, and a monovalent metal salt, a divalent metal salt, an ammonium salt, and an organic amine salt of these acids thereof, and mixtures thereof. For example, the crosslinking reactive group-containing monomer may be an acrylic acid, a methacrylic acid, or a mixture thereof.

According to one embodiment, the poly(vinylamide)-based copolymer may include a repeating unit derived from vinylpyrrolidone and a repeating unit derived from (meth) acrylic acid.

An amount of the repeating unit derived from the crosslinking reactive group-containing monomer in the poly (vinylamide)-based copolymer may be, based on the total moles of the monomer components constituting the poly (vinylamide)-based copolymer, greater than 0 mol % and less than 50 mol %, for example, from about 1 mol % to about 45 mol %, about 5 mol % to about 40 mol %, or about 10 mol % to about 30 mol %. By using a poly(vinylamide)-based copolymer having these amounts ranges of the repeating unit derived from a crosslinking reactive group-containing monomer, a coated separator having high heat resistance may be prepared through a crosslinking reaction by a crosslinking agent.

The poly(vinylamide)-based copolymer may have a weight average molecular weight of about 100,000 g/mol to about 1,000,000 g/mol. For example, the weight average molecular weight of the poly(vinylamide)-based copolymer may be from about 150,000 g/mol to about 800,000 g/mol, for example, from about 200,000 g/mol to about 700,000 g/mol, or from about 300,000 g/mol to about 600,000 g/mol. Within these range, a coating separator having a low shrinkage rate when stored at a high temperature, may be prepared. For example, within these ranges, when stored at 150° C. for 1 hour, a coating separator having a shrinkage rate of 5% or less may be prepared.

The poly(vinylamide)-based copolymer may have a glass transition temperature of 150° C. or higher. For example, the glass transition temperature of the poly(vinylamide)-based copolymer may be about 150° C. to about 300° C., for example, about 170° C. to about 280° C., or about 190° ° C. to about 250° C. Within these ranges, a separator coating layer having high heat resistance may be formed.

In some embodiments, the poly(vinylamide)-based copolymer may be an aqueous cross-linking reactive polyvinylidene-acrylic acid-based copolymer.

The amount of the poly(vinylamide)-based copolymer may be from about 10 wt % to 100 wt % based on the total weight of the binder. For example, the amount of the poly(vinylamide)-based copolymer may be from about 30 wt % to about 95 wt %, from about 50 wt % to about 90 wt %, or from about 60 wt % to about 80 wt %, based on the total weight of the binder. Within these ranges, a separator coating composition may obtain improved heat resistance and moisture characteristics.

The separator coating composition may further include, as a binder, an aqueous binder that is commonly used in the art. An aqueous binder of the related art may include, for example, at least one selected from polyvinyl alcohol, polyvinyl acetate, polyacrylic acid, polyacrylic acid ester, polymethacrylic acid, polymethacrylic acid ester, poly-N-vinylcarboxylic acid amide, polyacrylonitrile, polyether, polyamide, an ethylene vinyl acetate copolymer, polyethylene oxide, cellulose acetate, cellulose acetate butylate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile styrene butadiene copolymer, and polyimide.

The multifunctional crosslinking agent having at least bifunctionality included in the separator coating composition may include, for example, at least one selected from ethylene glycol diglycidyl ether, polyethylene glycol diglycidyl ether, glycerol polyglycidyl ether, glycerol triglycidyl ether, propylene glycol diglycidyl ether, polypropylene glycol diglycidyl ether, ethylene glycol, diethylene glycol, propylene glycol, triethylene glycol, tetra ethylene glycol, propanediol, dipropylene glycol, polypropylene glycol, glycerin, polyglycerin, butanediol, heptanediol, hexanediol trimethylolpropane, pentaerythritol, sorbitol, pentaerythritol tetraglycidyl ether, pentaerythritol triallyl ether, pentaerythritol triacrylate, pentaerythritol tetraacrylate, and methylene bisacrylamide. By using a multifunctional crosslinking agent, an aqueous crosslinking reactive poly(vinylamide)-based copolymer may be crosslinked to have a network structure, thereby providing a separator coating layer having high heat resistance.

The amount of the multifunctional crosslinking agent may be in the range of 1 parts by weight to 45 parts by weight, based on 100 parts by weight of the poly(vinylamide)-based copolymer. Within these ranges, a desired level of crosslinking may be induced, and thus a coating layer capable of exhibiting high heat resistance may be formed.

In the case where inorganic particles are included in a separator coating composition formed from the composition, the possibility of short circuit between the positive electrode and the negative electrode is reduced. Accordingly, the inorganic particles included in the composition for coating the separator may contribute an increase in the stability of the battery. The inorganic particles included in the separator coating composition may be a metal oxide, a metalloid oxide, or a combination thereof. Example of the inorganic particles are alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, and magnesium oxide. The inorganic particles may be, for example, $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or combinations thereof. Considering the crystal growth and economical efficiency of the vinylidene fluoride-hexafluoropropylene copolymer, the inorganic particles may be alumina, titania, boehmite, barium sulfate, or a combination thereof. Inorganic particles may be spherical, plate, fibrous, etc., but are not limited to these, and may be any form that are usable in the art. Plate-like inorganic particles include, for example, alumina and boehmite. In this case, reduction of the separator area at high temperature can be further suppressed, a relatively large porosity can be guaranteed, and characteristics can be improved during penetration evaluation of a lithium battery. In the case where the inorganic particles are plate-shaped or fibrous, the inorganic particles may have an aspect ratio of about 1:5 to 1:100. For example, the aspect ratio may be about 1:10 to about 1:100. For example, the aspect ratio may be about 1:5 to about 1:50. For example, the aspect ratio may be about 1:10 to about 1:50. The length ratio of the major axis to the minor axis on the flat surface of the plate-shaped inorganic particles may be 1 to 3. For example, the length ratio of the major axis to the minor axis on the flat surface may be 1 to 2. For example, the length ratio of the major axis to the minor axis on the flat surface may be about 1. The aspect ratio and the length ratio of the major axis to the minor axis may be measured through a scanning electron microscope (SEM). Within the aspect ratio and the length ratio of the major axis to the minor axis, the shrinkage of the separator may be suppressed, relatively improved porosity may be guaranteed, and penetration characteristics of the lithium battery may be improved. In the case where the inorganic particles are in the form of a plate, the average angle of the flat surface of the inorganic particles with respect to one surface of the porous substrate may be 0 degrees to 30 degrees. For example, the average angle of the flat surface of the inorganic particles with respect to one surface of the porous substrate may converge to 0 degree. That is, one surface of the porous substrate and the flat surface of the inorganic particles may be parallel to each other. For example, in the case where the average angle of the flat surface of the inorganic particles with respect to one surface of the porous substrate is within these ranges, heat shrinkage of the porous substrate may be effectively prevented, and a separator with reduced shrinkage can be provided. The organic particles may be cross-linked polymers. The organic particles may be highly cross-linked polymers having no glass transition temperature (Tg). In the case where a highly crosslinked polymer is used, heat resistance is improved and shrinkage of the porous substrate at high temperatures may be effectively suppressed.

In the separator coating composition, a weight ratio of the total weight of the binder to the weight of the inorganic particles may be 0.1:99.9 to 50:50. For example, the total weight of the binder and the weight ratio of the inorganic particles may be 1:99 to 20:80 or 3:97 to 30:70. Within these ranges, a separator coating composition having excellent substrate binding force and excellent heat resistance, may be obtained.

The separator coating composition may further include organic particles. Organic particles may include, for example, styrene-based compounds and derivatives thereof, methyl methacrylate-based compounds and derivatives thereof, acrylate-based compounds and derivatives thereof, diallyl phthalate-based compounds and derivatives thereof, polyimide-based compounds and derivatives thereof, urethane-based compounds and derivatives thereof, copolymers of these, or combinations of these, and are not limited thereto. The organic particles may be any organic particle that can be used in the art. For example, the organic particles may be crosslinked polystyrene particles or crosslinked polymethylmethacrylate particles. The particles may be secondary particles formed by aggregation of primary particles. Regarding the separator including secondary particles, the porosity of the coating layer is increased, so that a lithium battery having excellent high power characteristics may be provided.

The separator coating composition may be provided in the form of a slurry by including water as a solvent capable of dispersing these components. The separator coating composition may further include an organic solvent as long as the aqueous properties are not impaired. The organic solvent may be an alcohol-based organic solvent. For example, the organic solvent may include one or more selected from methanol, ethanol, propanol, and butanol. By using an alcohol-based organic solvent, a separator coating composition that is harmless to the body and has excellent drying properties, thereby guarantying mass productivity without a decrease in productivity, can be provided. In some embodiments, water and organic solvent may be included in a volume ratio of 100:0 to 60:40. For example, water and the organic solvent may be included in a volume ratio of 95:5 to 80:20, for example, a volume ratio of 85:15 to 70:30. Within these ranges a separator coating composition with improved drying properties may be obtained.

The solvent is volatilized through drying after coating the separator coating composition, so that it does not exist in the finally obtained coating layer of the separator.

A separator manufacturing method according to an embodiment includes coating the separator coating composition on one surface or opposite surfaces of a porous substrate and hot-air drying the porous substrate coated with the separator coating composition thereon, thereby obtaining a separator in which a coating layer is disposed on the porous substrate.

First, the separator coating composition is coated on one surface or opposite surfaces of the porous substrate during the porous substrate is moved.

The method of coating the separator coating composition on one surface or opposite surfaces of the moving porous substrate is not particularly limited, and may be at least one selected from a forward roll coating method, a reverse roll coating method, a microgravure coating method, and a direct metering coating method, but is not limited thereto. The coating method may be, for example, a direct metering coating method.

Subsequently, the porous substrate coated with the separator coating composition thereon is moved into a dryer.

In the case where the dryer, the porous substrate coated with the separator coating composition is dried with hot air. As such, a separator having a coating layer disposed on the porous substrate is prepared. The porous substrate coated with the separator coating composition is supplied to one surface of the dryer, dried by hot air in the dryer, and discharged to the other side of the dryer. In the dryer, hot air is supplied from upper nozzles and lower nozzles disposed alternately or symmetrically on the upper and lower portions of the porous substrate coated with the separator coating composition.

The movement speed of the porous substrate in the dryer may be the same as the coating speed. In the case where the movement speed of the porous substrate is too small, the inorganic particles included in the separator coating composition are mainly distributed at the interface between the coating layer and the porous substrate and thus, the binding force between the coating layer and the porous substrate may be decreased. In the case where the movement speed of the porous substrate is too high, the inorganic particles in the coating layer are mainly distributed near the surface of the coating layer facing the electrode, and thus the binding force between the separator and the electrode may deteriorate.

The hot air supply speed in the dryer may be, for example, about 10 m/s to about 50 m/s, about 10 m/s to about 40 m/s, about 10 m/s to about 30 m/s, or about 10 m/s to about 20 m/s, and the drying completion speed may be greater than 15 mpm. By having these ranges of hot air supply speed and drying completion speed, a separator with improved bending strength and peel strength can be manufactured at higher production speeds. In the case where the hot air supply speed is too small, the inorganic particles included in the separator coating composition are mainly distributed at the interface between the coating layer and the porous substrate and thus, the binding force between the coating layer and the porous substrate may be decreased. In the case where the hot air supply speed of the porous substrate is too high, the inorganic particles in the coating layer are mainly distributed near the surface of the coating layer facing the electrode, and thus the binding force between the separator and the electrode may deteriorate.

The hot air drying temperature in the dryer may be, for example, 30° C. to 80° C., 35° ° C. to 75° C., 40° ° C. to 70° C., or 45° C. to 65° C. Within these ranges of the hot air temperature, a separator having a bending strength and a peel strength which are improved at the same time, can be manufactured. In the case where the hot air drying temperature is too low, drying may proceed incompletely. In the case where the hot air drying temperature is too high, a uniform coating-layer structure may not be obtained due to rapid volatilization of the solvent.

The stay time of the porous substrate in the dryer may be, for example, 10 seconds to 50 seconds, 10 seconds to 45 seconds, or 10 seconds to 40 seconds, 10 seconds to 35 seconds, or 10 seconds to 30 seconds. Within these ranges of the stay time in the dryer, a separator having a bending strength and a peel strength which are improved at the same time, can be manufactured. In the case where the stay time of the porous substrate in the dryer is too short, uniform phase separation may not be achieved. In the case where the stay time of the porous substrate in the dryer is excessively long, the base film and pores of the entire membrane may shrink.

The non-solvent supplied into the dryer during hot air drying in the dryer may be at least one selected from water and alcohol. The non-solvent may be, for example, water vapor. Alcohol may be, for example, methanol, ethanol, propanol, and the like.

A separator according to another embodiment includes: a porous substrate; and a coating layer disposed on one surface or opposite surfaces of the porous substrate, wherein the coating layer includes a dried cross-linked product of the separator coating composition.

Since the separator coating composition is cross-linked and dried, the coating layer may include inorganic particles and a polymer-containing binder in which the poly(vinylamide)-based copolymer is cross-linked, wherein, the polymer may have a network structure in which the crosslinking reactive group included in the poly(vinylamide)-based copolymer is cross-linked by the multifunctional crosslinking agent.

The thickness of the coating layer in the separator may be, per one surface of the porous substrate, 4 µm or less, for example, 3 µm or less, 2.5 µm or less, 2 µm or less, or 1.5 µm or less. The thickness of the coating layer may be, per one surface of the porous substrate, 0.5 µm or more, for example, 1 µm or more. In the case where the coating layer is formed to have such ranges of thickness, the heat resistance of the separator may be increased. As the number of functional groups of the crosslinking agent is increase, even with the formation of a thinner coating layer, a thermal shrinkage rate of 5% or less may be exhibited even at a high temperature of, for example, 150° C.

A separator including a coating layer formed from the separator coating composition may have such good physical properties that the number of black dots per unit area (1 m$^2$) is less than 0.04. The number of black dots per unit area (1 m$^2$) of the separator may be 0.003 or less, 0.002 or less, or 0.001 or less.

The electrode assembly including the separator disposed between the positive electrode and the negative electrode and wound in a jelly roll form may have a bending strength of 460 N or more and a peel strength of 0.3 N/m or more. Since the separator exhibits a bending strength of 460 N or more and a peel strength of 0.3 N/m or more, the energy density and cycle characteristics of a lithium battery including the separator may be improved.

The porous substrate included in the separator may be a porous film containing polyolefin. Polyolefin has an excellent short circuit prevention effect and may improve the battery stability by a shutdown effect. For example, the porous substrate may be a membrane including the resin of polyolefins such as polyethylene, polypropylene, polybutene, and polyvinyl chloride, and mixtures or copolymers thereof, but is not limited thereto and may be any porous membrane that is used in the art. For example, a porous membrane made of a polyolefin resin, a porous membrane woven with polyolefin fibers; a non-woven fabric containing polyolefin; aggregates of insulating material particles and the like may be used. For example, a porous membrane containing polyolefin provides excellent applicability of a binder solution for manufacturing a coating layer formed on a porous substrate. Also, the porous membrane may enable the preparation of a separator having a thin membrane, leading to an increase in the ratio of an active material in a battery, and an increase in capacity per unit volume.

The polyolefin used as the material of the porous substrate may be, for example, polyethylene, polypropylene and the like; a homopolymer thereof; a copolymer thereof; or a mixture thereof. Polyethylene may be low-density, medium-density, or high-density polyethylene, and in the case where mechanical strength is considered, high-density polyethylene may be used. In addition, two or more types of polyethylene may be mixed for the purpose of imparting flexibility. The polymerization catalyst used for preparing polyethylene is not particularly limited, and a Ziegler-Natta catalyst, a Phillips catalyst, a metallocene catalyst, or the like may be used. In the case where both mechanical strength and high permeability are considered, the weight average molecular weight of polyethylene may be 100,000 to 12,000,000, for example, 200,000 to 3,000,000. Polypropylene may be a homopolymer, a random copolymer, or a block copolymer, and may be used alone or in combination of two or more thereof. In addition, the polymerization catalyst is not particularly limited, and a Ziegler-Natta catalyst or a metallocene catalyst may be used. In addition, stereoregularity is not particularly limited, and isotactic, syndiotactic or atactic may be be used. In some embodiments, inexpensive isotactic polypropylene may be used. In addition, polyolefins other than polyethylene or polypropylene and additives such as antioxidants may be added to polyolefins within a range that does not impair the effects of the present disclosure.

The porous substrate included in the separator may include, for example, polyolefin such as polyethylene and polypropylene, and a multi-layer film of two or more layers may be used. For example, the separator may have, for example, a mixed multi-layer film, such as a two-layer polyethylene/polypropylene separator, a three-layer polyethylene/polypropylene/polyethylene separator, or a three-layer polypropylene/polyethylene/polypropylene separator may be used. However, the structure thereof is not limited thereto, and any material and structure that can be used as a porous substrate in the art may be used herein. The porous substrate included in the separator may include, for example, a diene-based polymer prepared by polymerizing a monomer composition including a diene-based monomer. The diene-based monomer may be a conjugated diene-based monomer or a non-conjugated diene-based monomer. For example, the diene-based monomer may include at least one selected from 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene and 1,4-hexadiene, and is not limited thereto, and may be any one that is used as a diene-based monomer in the art.

The porous substrate included in the separator may have a thickness of 1 µm to 100 µm. For example, the porous substrate may have a thickness of 1 µm to 30 µm. For example, the porous substrate may have a thickness of 5 µm to 20 µm. For example, the porous substrate may have a thickness of 5 µm to 15 µm. For example, the porous substrate may have a thickness of 5 µm to 10 µm. In the case where the thickness of the porous substrate is less than 1 µm, it may be difficult to maintain mechanical properties of the separator, and in the case where the thickness of the porous substrate is greater than 100 µm, the internal resistance of the lithium battery may be increased. The porosity of the porous substrate included in the separator may be 5% to 95%. In the case where the porosity is less than 5%, the internal resistance of the lithium battery may be increased, and in the case where the porosity is greater than 95%, it may be difficult to maintain mechanical properties of the porous substrate. The pore size of the porous substrate in the separator may be 0.01 µm to 50 µm. For example, the pore size of the porous substrate in the separator may be 0.01 µm to 20 µm. For example, the pore size of the porous substrate in the separator may be 0.01 µm to 10 µm. In the case where the pore size of the porous substrate is less than 0.01 µm, the internal resistance of the lithium battery may be increased, and in the case where the pore size of the porous substrate is greater than 50 µm, it may be difficult to maintain mechanical properties of the porous substrate.

The coating layer may be disposed on one surface or opposite surfaces of the porous substrate. The coating layer is formed from the separator coating composition. The coating layer may have, for example, a single-layer structure or a multi-layer structure. For example, the coating layer may be disposed on only one surface of the porous substrate and may not be disposed on the other side. In some embodiments, the coating layer may have a multi-layer structure. In the multi-layered coating layer, layers selected from organic layers, inorganic layers, and organic-inorganic layers may be arbitrarily disposed. The multi-layer structure may be a two-layer structure, a three-layer structure, or a four-layer structure, but is not limited to such a structure and may be selected according to required characteristics of the separator. The coating layer may be respectively disposed on each of opposite surfaces of the porous substrate, for example. The coating layers respectively disposed on opposite surfaces of the porous substrate may independently be organic layers, inorganic layers, or organic-inorganic layers, and at least one of these includes the separator coating composition. In addition, at least one of the coating layers respectively disposed on opposite surfaces of the porous substrate may have a multi-layer structure. In the multi-layered coating layer, layers selected from organic layers, inorganic layers, and organic-inorganic layers may be arbitrarily disposed. The multi-layer structure may be a two-layer structure, a three-layer structure, or a four-layer structure, but is not limited to such a structure and may be selected according to required characteristics of the separator.

The coating layer included in the separator includes, for example, 0.3 to 0.4 pores with a diameter of 500 nm to 1000 nm per 1 $\mu m^2$ and 0.5 to 1.5 pores with a diameter of less than 500 nm per 1 $\mu m^2$. A pore with a diameter of 500 nm to 1000 nm per 1 $\mu m^2$ is, for example, a large-diameter pore, and a pore with a diameter of less than 500 nm per 1 $\mu m^2$ is, for example, a small-diameter pore. In the case where the separator has these numbers of large-diameter pores and small-diameter pores, the separator may provide balanced air permeability.

In the case where the number of large-diameter pores included in the separator is less than 0.3 and the number of small-diameter pores is greater than 0.15, the air permeability of the separator may be excessively increased. Accordingly, since the internal resistance of the separator impregnated with the electrolyte is increased, the cycle characteristics of a lithium battery including the separator may deteriorate. In the case where the number of large-diameter pores included in the separator is greater than 0.4 and the number of small-diameter pores is less than 0.5, the air permeability of the separator is too low. Therefore, it is difficult for the separator to suppress the growth of lithium dendrites generated during the charging and discharging process, and thus the short circuit of the lithium battery including the separator may be highly likely increased. The air permeability may be, for example, Gurley air permeability obtained by measuring the time required for 100 cc of air to pass through the separator according to JIS P-8117.

The surface of the coating layer included in the separator may have a morphology including, for example, a plurality of pores in the form of islands discontinuously disposed on a polymer film. The surface of the coating layer included in the separator may show a morphology in which a plurality of pores are discontinuously disposed on the polymer film. The surface of the coating layer is basically made of a polymer film, and may have a morphology in which pores are irregularly arranged in the form of islands on the polymer film. In the case where the coating layer included in the separator has such a morphology, the bending strength and peel strength of the separator may be improved. As a result, the energy density and cycle characteristics of the lithium battery including the separator may be improved. In contrast, in the case of a separator of the related art, the surface of a coating layer included in the separator does not show a polymer film, and shows a morphology in which a plurality of fine particles are connected to each other to form a porous surface.

The amount of inorganic particles included in the coating layer may be 98 wt % or less, 85 wt % or less, or 80 wt % or less, based on the total weight of the coating layer. The amount of inorganic particles included in the coating layer formed from the separator coating composition may be 50 wt % or more, 55 wt % or more, or 60 wt % or more, based on the total weight of the coating layer. The amount of inorganic particles included in the coating layer formed from the separator coating composition may be, based on the total weight of the coating layer, 55 wt % to 99 wt %, 60 wt % to 85 wt %, or 60 wt % to 80 wt %. In the case where the coating layer formed from the separator coating composition has these amount ranges of inorganic particles, the bending strength and peel strength of the separator may be increased at the same time.

The average particle diameter of the inorganic particles included in the coating layer may be 50 nm to 2 $\mu m$, 100 nm to 1.5 $\mu m$, or 150 nm to 1.0 $\mu m$. The average particle diameter of the inorganic particles may be measured using, for example, a laser diffraction method or a dynamic light scattering method measuring device. The average particle diameter of inorganic particles may be measured using, for example, a laser scattering particle size distribution analyzer (for example, Horiba LA-920), and may be the median particle diameter (D50) when accumulated by 50% from the smaller particle in terms of volume. In the case where the inorganic particles have these ranges of average particle diameters, the binding force between the coating layer and the porous substrate and the binding force between the coating layer and an electrode may all be increased. In addition, by using inorganic particles having these ranges of average particle diameter, a separator including a coating layer containing inorganic particles may have an appropriate porosity. In the case where the average particle diameter of the inorganic particles is less than 50 nm, the air permeability of the separator may decrease and moisture amount may be increased.

Figure 1:
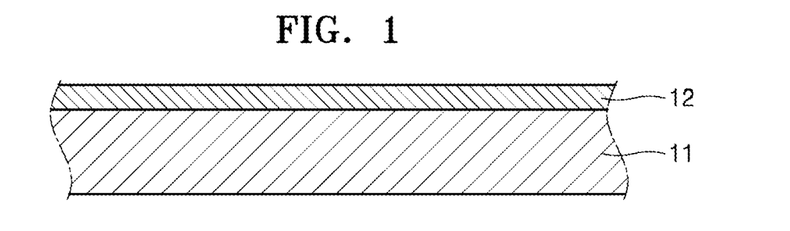
FIG. 1 shows a schematic cross-sectional view of a separator according to an embodiment.
Figure 2:
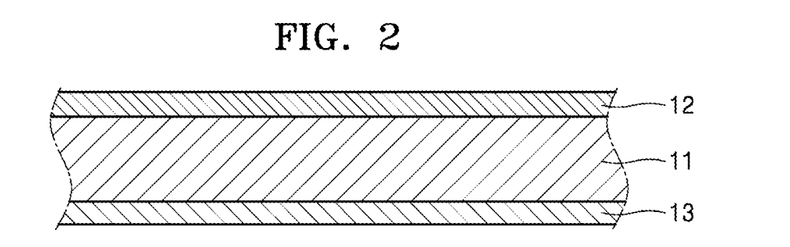
FIG. 2 shows a schematic cross-sectional view of a separator according to an embodiment.

The thickness of the coating layer may be, for example, 0.5 $\mu m$ to 4 $\mu m$, 0.5 $\mu m$ to 3 $\mu m$, or 0.5 $\mu m$ to 2 $\mu m$, per one surface of the separator. In the case where the thickness of the coating layer per one surface is too great, the volume of the rolled electrode assembly may be increased. In the case where the thickness of the coating layer per one surface is too small, improved bending strength and peel strength may not be obtained. By disposing the coating layer on one surface or opposite surfaces of the porous substrate, the binding force between the coating layer and an electrode may be further improved, and as a result, the volume change during charging and discharging of the lithium battery may be suppressed. For example, referring to FIGS. 1 and 2, a coating layer 12 may be disposed on one surface of the porous substrate 11 in the separator, or coating layers 12 and 13 may be disposed on opposite surfaces thereof, respectively.

The porosity of the coating layer may be 30% to 90%, 35% to 80%, or 40% to 70%. In the case where the coating layer has these ranges of porosity, an increase in internal resistance of the separator may be prevented, and excellent film strength may be provided while having excellent high-rate characteristics. The porosity of the coating layer is the volume occupied by pores with respect to the total volume of the coating layer.

The coating amount of the coating layer may be, for example, 1.0 $g/m^2$ to 4.5 $g/m^2$, 1.2 $g/m^2$ to 4.5 $g/m^2$, 1.5 $g/m^2$ to 4.5 $g/m^2$, or 1.7 $g/m^2$ to 4.5 $g/m^2$. In the case where the coating amount of the coating layer is within these ranges, the separator including the coating layer may simultaneously provide improved heat resistance, peel strength, and bending strength. In the case where the coating amount of the coating layer is too small, improved heat resistance, bending strength and peel strength may not be obtained.

The binder included in the coating layer may not have a concentration gradient in which the concentration of the binder increases in a direction from an interface in contact with the porous substrate of the porous layer to a surface thereof facing the electrode. In some embodiments, the binder included in the coating layer may have a concentration gradient in which the concentration of the binder decreases in a direction from an interface in contact with the porous substrate of the porous layer to a surface thereof facing the electrode, or a concentration gradient in which there is no change in the concentration.

A thermal contraction rate (%) of the separator may be 5% or less in a temperature range of 50° ° C. to 150° C. The separator may exhibit a thermal contraction rate of 5% or less even at a high temperature of, for example, 150° C. For example, the thermal contraction rate (%) of the separator may be 5% or less in both the machine direction (MD) and the transverse direction (TD) in a temperature range of 50° C. to 150° C. For example, the separator may have a thermal contraction rate (%) of 4% or less, 3% or less, 2% or less, or 1% or less in both the MD and TD directions in the temperature range of 50° C. to 150° C. For example, the separator may have a thermal contraction rate (%) of 1% to 5% in both the MD and TD directions in the temperature range of 50° ° C. to 150° C. In the case where the thermal contraction rate of the separator is within the above range, the thermal contraction of the separator may be suppressed, and the rate characteristics and life characteristics may be effectively improved. The separator may show improved heat resistance due to significant suppression in the heat contraction of the separator even at high temperature obtained by coating using the separator coating composition according to an embodiment.

A lithium battery according to another embodiment includes a positive electrode, a negative electrode, and the separator disposed between the positive electrode and the negative electrode. According to one embodiment, the lithium battery may include an electrode assembly including a positive electrode, a negative electrode, and the separator disposed between the positive electrode and the negative electrode, and the electrode assembly has a wound shape, for example, a jelly roll shape. In the case where a lithium battery includes the separator described above, black spot defects can be reduced and the quality can be improved, and since the adhesive force between the electrode (positive electrode and negative electrode) and the separator is increased, the change in volume during charging and discharging of the lithium battery may be suppressed. Accordingly, degradation of the lithium battery accompanying a change in volume of the lithium battery may be suppressed, and lifespan characteristics of the lithium battery may be improved.

A lithium battery can be manufactured, for example, in the following way.

First, a negative active material composition in which a negative active material, a conductive material, a binder, and a solvent are mixed, is prepared. The negative active material composition is directly coated on a metal current collector to manufacture a negative electrode plate. Alternatively, the negative active material composition may be cast on a separate support, and then a film separated from the support may be laminated on a metal current collector to manufacture a negative electrode plate. The negative electrode is not limited to the shapes listed above and may have shapes other than the shape described above.

The negative active material may be a carbon-based material. For example, the carbon-based material may be crystalline carbon, amorphous carbon, or a mixture thereof. The crystalline carbon may be non-shaped, plate-like, flake-like, spherical or fibrous graphite, such as natural graphite or artificial graphite, and the non-shaped carbon may be soft carbon (low temperature calcined carbon) or hard carbon, mesophase pitch carbide, calcined coke, or the like.

In addition, a composite of a carbon-based material and a non-carbon-based material may be used as the negative active material, and a non-carbon-based material may be additionally included in addition to the carbon-based material.

Examples of the non-carbon-based material include at least one selected from a metal capable of forming an alloy with lithium, an alloy of a metal capable of forming an alloy with lithium, and an oxide of a metal capable of forming an alloy with lithium.

For example, the metal capable of forming an alloy with lithium may be a Si, Sn, Al, Ge, Pb, Bi, Sb Si—Y alloy (wherein Y is an alkali metal, an alkaline earth metal, a Groups 13 to 16 element, a transition metal, and a rare earth element or a combination thereof, but not Si), a Sn—Y alloy (wherein Y is an alkali metal, an alkaline earth metal, a Groups 13 to 16 element, a transition metal, a rare earth element, or a combination thereof, but not Sn), etc. The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, or lithium vanadium oxide.

For example, the non-transition metal oxide may be $SnO_2$, $SiO_x$ (0<x<2), or the like.

Specifically, the negative active material may be at least one selected from Si, Sn, Pb, Ge, Al, SiOx (0<x≤2), SnOy (0<y≤2), $Li_4Ti_5O_{12}$, $TiO_2$, $LiTiO_3$, and $Li_2T_{13}O_7$, but is not limited thereto. The negative active material may be any non-carbon based negative active material that is used in the art.

The conductive material may be one or at least one of acetylene black, Ketjenblack™, natural graphite, artificial graphite, carbon black, acetylene black, carbon fiber, metal powder or metal fiber of, for example, copper, nickel, aluminum, silver, or the like. In some embodiments, the conductive material may be one or at least one of conductive materials, such as polyphenylene derivatives. However, the conductive material is not limited thereto and may be any material that is used as a conductive material in the related art. In addition, the crystalline carbon-based material may be added as a conductive material.

As the binder, a vinylidene fluoride/hexafluoropropylene copolymer, polyvinylidene fluoride (PVDF), polyacrylonitrile, polymethylmethacrylate, polytetrafluoroethylene and mixtures thereof, or a styrene butadiene rubber-based polymer may be used. Any binder may be used as long as it is used in the art.

As the solvent, N-methylpyrrolidone, acetone, water, or the like may be used, but the present disclosure is not limited thereto. Any solvent may be used as long as it is used in the art.

The amounts of the negative active material, the conductive material, the binder, and the solvent are the levels that are normally used in lithium batteries. At least one of the conductive material, the binder, and the solvent may be omitted depending on the use and configuration of the lithium battery.

Meanwhile, the binder used for preparing the negative electrode may be the same as used in the separator coating composition included in the coating layer of the separator.

Next, a positive active material composition in which a positive active material, a conductive material, a binder, and a solvent are mixed, is prepared. The positive active material composition is directly coated and dried on the metal current collector to produce a positive electrode plate. Alternatively, the positive electrode plate may be manufactured by casting the positive active material composition on a separate support and then laminating a film, peeled from the support, on a metal current collector.

The positive active material may include at least one selected from lithium cobalt oxide, lithium nickel cobalt manganese oxide, lithium nickel cobalt aluminum oxide, lithium iron phosphate, and lithium manganese oxide, but is not necessarily limited thereto, and may be any material that can be used as the positive active material in the art.

For example, the positive active material may be a compound represented by one of $Li_aA_{1-b}B_bD_2$ (where $0.90 \le a \le 1.8$ and $0 \le b \le 0.5$); $Li_aE_{1-b}B_bO_{2-c}D_c$ (where $0.90 \le a \le 1.8$, $0 \le b \le 0.5$, and $0 \le c \le 0.05$); $LiE_{2-b}B_bO_{4-c}D_c$ (where $0 \le b \le 0.5$ and $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where $0.90 \le a \le 1.8$, $0 \le b \le 0.5$, $0 < c \le 0.05$, $0 < \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1.8$, $0 \le b \le 0.5$, $0 \le c \le 0.05$, and $0 < \alpha < 2$); $Li_aN_{ib}E_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d < 0.5$, and $0.001 \le e \le 0.1$); $Li_aNiG_bO_2$ (where $0.90 \le a \le 1.8$, $0.001$ and $\le b \le 0.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In these formulae, A is Ni, Co, Mn, or a combination thereof; B is Al, Ni, Co, Mn, Cr, Fe, Mg, Sr, V, a rare earth element, or a combinations thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

Also, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the positive active material (for example, spray coating, dipping or the like). This coating method will be understood by those skilled in the art, so that a detailed description thereof will be omitted. For example, $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \le x < 0.5$, $0 \le y \le 0.5$), $LiFeO_2$, $V_2O_5$, TiS, MoS, or the like may be used.

In the case of the positive active material composition, the conductive material, the binder, and the solvent which are used as in the case of the negative active material composition may be used. Meanwhile, it is also possible to form pores inside the electrode plate by further adding a plasticizer to the positive active material composition and/or the negative active material composition.

The amounts of the positive active material, the conductive material, the binder, and the solvent are the levels that are normally used in lithium batteries. Depending on the use and configuration of the lithium battery, one or more of the conductive material, a general binder, and a solvent may be omitted.

Meanwhile, the binder used for preparing the positive electrode may be the same as used in the separator coating composition included in the coating layer of the separator.

Next, the separator is disposed between the positive electrode and the negative electrode.

In the electrode assembly including the positive electrode/separator/negative electrode, the separator disposed between the positive electrode and the negative electrode may include, as described above, a porous substrate as described above; and a coating layer disposed on opposite surfaces of the porous substrate, wherein the coating layer includes a dried cross-linked product of the separator coating composition.

A separator may be separately prepared and disposed between the positive electrode and the negative electrode. Alternatively, the separator may be prepared as follows: the electrode assembly including the positive electrode/separator/negative electrode is wound into the jelly roll shape, which is then placed in a battery case or a pouch, and while being placed inside the battery case or pouch, the jelly roll is pressed and thermally softened to perform pre-charging, and the charged jelly roll is hot-pressed and the charged jelly roll is cold-pressed, and the charged jelly roll is charged and discharged under pressure to perform a formation process.

Next, an electrolyte is prepared.

The electrolyte may be in a liquid or gel state.

For example, the electrolyte may be an organic electrolyte. Also, the electrolyte may be solid. For example, boron oxide, lithium oxynitride, etc. may be used. The electrolyte is not limited thereto, and may be any solid electrolyte that can be used in the art. The solid electrolyte may be formed on the negative electrode by a method such as sputtering.

For example, an organic electrolyte solution may be prepared. The organic electrolyte solution may be prepared by dissolving a lithium salt in an organic solvent.

Any organic solvent that can be used as an organic solvent in the art may be used. For example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, methyl propionate, ethyl propionate, propyl propionate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether or mixtures thereof, may be used.

Any lithium salt that can be used as a lithium salt in the art, may be used herein. For example, $LiPF_6$, $LiBF_4$, $LiSbF_6$, $LiAsF_6$, $LiClO_4$, $LiCF_3SO_3$, $Li(CF_3SO_2)_2N$, $LiCAF_9SO_3$, LiAlO$_2$, LiAlCl$_4$, LiN(C$_x$F$_{2x+1}$SO$_2$)(C$_y$F$_{2y+1}$SO$_2$)(herein, x and y are natural numbers), LiCl, LiI, or mixtures thereof may be used.

Figure 3:
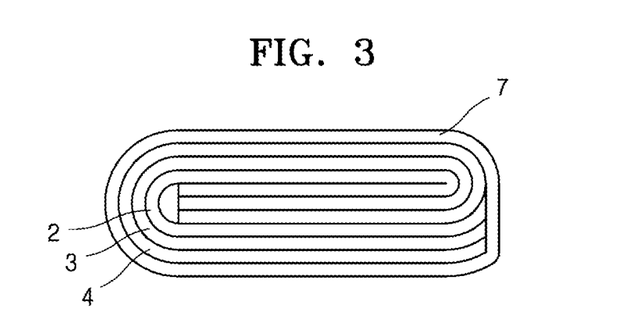
FIG. 3 shows a schematic diagram of a lithium battery including an electrode assembly wound into a flat jelly roll shape according to an embodiment.

As shown in FIG. 3, a lithium battery 1 may include a positive electrode 3, a negative electrode 2, and a separator 4. The positive electrode 3, the negative electrode 2, and the separator 4 described above are wound into a flat jelly roll shape electrode assembly, and then placed in a pouch 7. Subsequently, an organic electrolyte solution is injected into the pouch 7 and sealed to complete the manufacture of the lithium battery 1.

Figure 4:
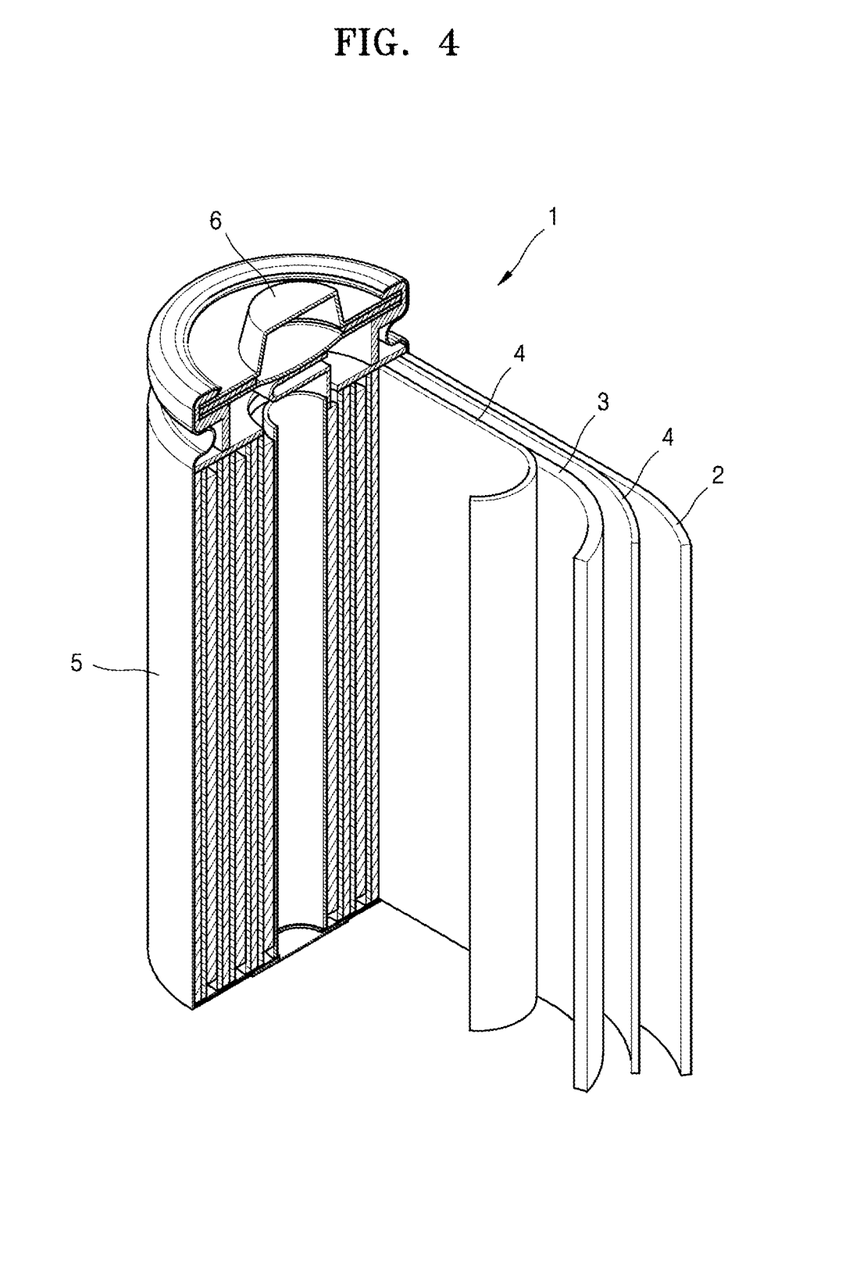
FIG. 4 shows a schematic diagram of a lithium battery including an electrode assembly wound into a cylinder jelly roll shape according to an embodiment.

As shown in FIG. 4, the lithium battery 1 may include a positive electrode 3, a negative electrode 2, and a separator 4. After the positive electrode 3, the negative electrode 2, and the separator 4 described above are wound into a cylindrical jelly roll-shaped electrode assembly, the resultant structure is placed in a battery case 5. Subsequently, an organic electrolyte solution is injected into the battery case 5 and sealed with a cap assembly 6 to complete the manufacture of the lithium battery 1. The battery case may be cylindrical, prismatic, or thin film. The lithium battery may be a lithium ion battery. The lithium battery may be a lithium polymer battery.

Lithium batteries have excellent high-rate characteristics and lifespan characteristics, so they are suitable for electric vehicles (EVs). For example, lithium batteries are suitable for hybrid vehicles such as plug-in hybrid electric vehicles (PHEVs).

MODE OF DISCLOSURE

This inventive concept will be described in more detail through the following examples and comparative examples. However, these examples are intended to illustrate the present inventive concept, and the scope of the present creative concept is not limited thereto.
(Manufacture of Separator)

Example 1: Application of Aqueous Crosslinking Binder and Tetrafunctional Crosslinking Agent, Coating Layer Thickness of 1.5 μm 9.52 wt % of boehmite (ACTILOX 200SM, Nabaltec) with an average particle diameter of 0.3 μm (D50 by volume), 0.30 wt % of a cross-linking reactive polyvinylpyrrolidone-acrylic acid in which an amount of the acrylic acid monomer is 10 mol % based on the total moles of the monomer components constituting the copolymer, 0.03 wt % of pentaerythritol tetraglycidyl ether as a crosslinking agent, 0.14 wt % of PVA (Daejeong Chemical, Mw 22,000), and 90.01 wt % of DI water, were mixed to prepare a coating solution.

The coating solution was coated on the cross section of an 8 μm thick polyethylene porous substrate (the company of CZMZ, NW0835) by bar coating, and then dried under conditions of a temperature of 80° C. and a wind speed of 15 m/sec to form a coating layer with a thickness of 1.5 μm, thereby forming a coating separator having the total thickness of 9.5 μm.

Example 2: Application of Aqueous Crosslinking Binder and Trifunctional Crosslinking Agent, Coating Layer Thickness of 2 μm 9.52 wt % of boehmite (ACTILOX 200SM, Nabaltec) with D50 0.3 μm, 0.30 wt % of a cross-linking reactive polyvinylpyrrolidone-acrylic acid in which an amount of the acrylic acid monomer is 10 mol % based on the total moles of the monomer components constituting the copolymer, 0.03 wt % of glycerol triglycidyl ether as a crosslinking agent, 0.14 wt % of PVA (Daejeong Chemical, Mw 22,000), and 90.01 wt % of DI water, were mixed to prepare a coating solution.

The coating solution was coated on the cross section of an 8 μm thick polyethylene porous substrate (the company of CZMZ, NW0835) to form a coating layer with a thickness of 2 μm, thereby forming a coating separator having a total thickness of 10 μm.

Example 3: Application of Aqueous Crosslinking Binder and Bifunctional Crosslinking Agent, Coating Layer Thickness of 2 μm 9.52 wt % of boehmite (ACTILOX 200SM, Nabaltec) with D50 0.3 μm, 0.30 wt % of a cross-linking reactive polyvinylpyrrolidone-acrylic acid in which an amount of the acrylic acid monomer is 10 mol % based on the total moles of the monomer components constituting the copolymer, 0.03 wt % of ethylene glycol diglycidyl ether as a crosslinking agent, 0.14 wt % of PVA (Daejeong Chemical, Mw 22,000), and 90.01 wt % of DI water, were mixed to prepare a coating solution.

The coating solution was coated on the cross section of an 8 μm thick polyethylene porous substrate (the company of CZMZ, NW0835) to form a coating layer with a thickness of 2 μm, thereby forming a coating separator having a total thickness of 10 μm.

Comparative Example 1: Removal of Crosslinking Agent in Example 1, Coating Layer Thickness of 2 μm 9.52 wt % of boehmite (ACTILOX 200SM, Nabaltec) with D50 0.3 μm, 0.33 wt % of a cross-linking reactive polyvinylpyrrolidone-acrylic acid in which an amount of the acrylic acid monomer is 10 mol % based on the total moles of the monomer components constituting the copolymer, 0.14 wt % of PVA (Daejeong Chemical, Mw 22,000), and 90.01 wt % of DI water, were mixed to prepare a coating solution.

The coating solution was coated on the cross section of an 8 μm thick polyethylene porous substrate (the company of CZMZ, NW0835) to form a coating layer with a thickness of 2 μm, thereby forming a coating separator having a total thickness of 10 μm.

Comparative Example 2: Application of Aqueous Crosslinking Binder and Monofunctional Crosslinking Agent, Coating Layer Thickness of 2 μm 9.52 wt % of boehmite (ACTILOX 200SM, Nabaltec) with D50 0.3 μm, 0.30 wt % of a cross-linking reactive polyvinylpyrrolidone-acrylic acid in which an amount of the acrylic acid monomer is 10 mol % based on the total moles of the monomer components constituting the copolymer, 0.03 wt % of allyl glycidyl ether as a crosslinking agent, 0.14 wt % of PVA (Daejeong Chemical, Mw 22,000), and 90.01 wt % of DI water, were mixed to prepare a coating solution.

The coating solution was coated on the cross section of an 8 μm thick polyethylene porous substrate (the company of CZMZ, NW0835) to form a coating layer with a thickness of 2 μm, thereby forming a coating separator having a total thickness of 10 μm.

Evaluation Example 1: Evaluation of High-Temperature Thermal Contraction Rate Characteristics The method for measuring the thermal contraction rate of the separator is not particularly limited, and a method commonly used in the technical field of the present disclosure may be used. A non-limiting example of a method for measuring the thermal contraction rate of a separator is as follows:

The separators prepared according to Examples 1 to 3 and Comparative Examples 1 and 2 were each cut into a size of about 10 cm in width (MD) and about 10 cm in length (TD), and stored in a chamber at 150° ° C. for 1 hour. Then, by measuring the degree of contraction in the separator in the MD and TD directions, the MD-direction thermal contraction rate and the TD-direction thermal contraction rate were calculated by Equations 1 and 2, respectively, and the larger measurement value from among the MD-direction thermal contraction rate and the TD-direction thermal contraction rate was calculated as the final value and listed in Table 1 below.

$$\text{Thermal contraction rate in } MD \text{ direction} = \qquad \text{Equation 1}$$
$$(\text{length reduced in } MD \text{ direction after high}$$
$$\text{temperature contraction rate evaluation/length of}$$
$$\text{separator in } MD \text{ direction before evaluation}) \times 100$$

$$TD \text{ direction thermal contraction rate} = \qquad \langle\text{Formula 2}\rangle$$
$$(\text{length reduced in } TD \text{ direction after evaluation}$$
$$\text{of high temperature contraction rate/length of}$$
$$\text{separator in } TD \text{ direction before evaluation}) \times 100$$

The values calculated by Equations 1 and 2 are shown in Table 1.

Evaluation Example 2: Evaluation of Water Contact Angle

Water contact angles of the separators prepared according to Examples 1 to 3 and Comparative Examples 1 and 2 were measured in the following manner, and results thereof are shown in Table 1 below.

Each separator was fixed on a glass plate, and then placed horizontally on the sample stage of the contact angle measuring instrument, and a syringe was filled with water, and then, 2 µl thereof was dropped on the surface of the separator, and the contact angle was read. This was measured three or more times, and the average value of the contact angle was shown.

Evaluation Example 3: Water Amount Evaluation

The moisture amounts of the separators prepared according to Examples 1 to 3 and Comparative Examples 1 and 2 were measured according to the Karl-Fischer measurement method, and results thereof are shown in Table 1. Moisture amount measurement conditions were 85° C., and 12 hours.

Evaluation Example 4: Substrate Binding Force Evaluation

Samples were prepared by cutting the separators manufactured according to Examples 1 to 3 and Comparative Examples 1 and 2 into a size of 12 mm wide and 50 mm long. Tape was attached to the surface of the sample where the coating layer was placed, and the attachment surface and the substrate was spaced from each other by about 10 mm to 20 mm, and the side of the substrate, to which the tape was not attached, was fixed to an upper grip and the coating layer side thereof, to which the tape was attached, was fixed to a lower grip while the interval between the upper grip and the lower grip was fixed to 20 mm, and then, peeling was performed by pulling in the 180° direction. The peeling speed was set to 10 mm/min, and the force required to peel 40 mm after the start of peeling was measured three times, and an average value thereof was obtained. The results of measuring the peel strength are shown in Table 1 below.

TABLE 1

|  | Thermal contraction rate (150° C., 60 minutes) | | Moisture contact angle | Moisture amount | Substrate binding force |
| --- | --- | --- | --- | --- | --- |
|  | MD (%) | TD (%) | (°) | (ppm) | (gf/mm) |
| Example 1 | 2 | 3 | 64 | 431 | 23 |
| Example 2 | 2 | 1 | 58 | 479 | 21 |
| Example 3 | 2 | 2 | 54 | 537 | 17 |
| Comparative Example 1 | 16 | 17 | 41 | 945 | 10 |
| Comparative Example 2 | 12 | 13 | 49 | 729 | 13 |

As shown in Table 1, in the case of the separator according to an embodiment, a binder containing an aqueous cross-linking reactive polyvinylpyrrolidone-based polymer, a multifunctional crosslinking agent, and ceramic are used to form a coating layer. Accordingly, even when the coating layer has a small thickness, high heat resistance may be obtained. As shown from the separators prepared in Examples 1 to 3, as the number of functional groups of the crosslinking agent is increased, the cross-linking reactivity is increased, the heat resistance is increased, the substrate binding force is increased, and the moisture amount is decreased. In addition, in the case where a crosslinking agent having a large number of functional groups is applied, it can be confirmed that the heat resistance property is exhibited even at a thinner coating thickness. More specifically, in Comparative Example 1 in which a crosslinking agent was not used and Comparative Example 2 in which a monofunctional crosslinking agent was used, in the case where the coating is performed with a small thickness, for example, 2 µm, the thermal contraction rate at 150° C. was 5% or less in the MD and TD directions. On the other hand, the separators prepared according to Examples 1 to 3 had a thermal contraction rate of 5% or less in both the MD and TD directions at 150° C. even at the small thickness of 2 µm or less by applying a multifunctional crosslinking agent. Furthermore, in Example 1 in which the tetrafunctional crosslinking agent was applied, even at the small thickness of 1.5 µm, a thermal contraction rate in both the MD and TD directions at 150° C. was 5% or less. This result indicates that as the number of functional groups of the crosslinking agent is increased, the heat resistance is improved, and thus, even at a smaller coating thickness, the heat resistance property may be obtained.

As described above, an embodiment has been described with reference to drawings and embodiments, but this is only an example, and those skilled in the art can understand that various modifications and equivalent other implementations are possible therefrom. Therefore, the scope of protection of the present invention should be defined by the appended claims.

EXPLANATION OF REFERENCE NUMERALS DESIGNATING THE MAJOR ELEMENTS OF THE DRAWINGS

11: Porous substrate
1: Lithium battery
3: Positive electrode
5: Battery case
7: Pouch
12, 13: Coating layer
2: Negative electrode
4: Separator
6: Cap assembly

INDUSTRIAL APPLICABILITY

A separator coating composition according to one aspect provides a separator having high heat resistance.

The invention claimed is:

1. A separator coating composition, comprising:
   a binder including a poly(vinylamide)-based copolymer which has aqueous crosslinking reactivity;
   a multifunctional crosslinking agent having at least bifunctionality;
   inorganic particles; and
   water,
   wherein the poly(vinylamide)-based copolymer includes a repeating unit derived from a vinylamide monomer and a repeating unit derived from a crosslinking reactive group-containing monomer,
   wherein the vinylamide monomer is selected from vinylpyrrolidone, vinylcaprolactam and mixtures thereof,
   wherein the crosslinking reactive group includes at least one selected from a carboxyl group, an isocyanate group, a hydroxyl group, and an oxazoline group, and
   wherein the multifunctional crosslinking agent includes at least one selected from ethylene glycol, diethylene glycol, propylene glycol, triethylene glycol, tetra ethylene glycol, propanediol, dipropylene glycol, polypropylene glycol, glycerin, polyglycerin, butanediol, heptanediol, hexanediol trimethylolpropane, pentaerythritol, sorbitol, pentaerythritol triallyl ether, pentaerythritol triacrylate, pentaerythritol tetraacrylate, and methylene bisacrylamide.

2. The separator coating composition as claimed in claim 1, wherein the crosslinking reactive group-containing monomer is a carboxyl group-containing monomer.

3. The separator coating composition as claimed in claim 1, wherein the crosslinking reactive group-containing monomer is a carboxylic acid selected from: an acrylic acid, a methacrylic acid, carboxyethyl acrylate, carboxypentyl acrylate, an itaconic acid, a maleic acid, a fumaric acid, a crotonic acid, and an isocrotonic acid; a monovalent metal salt, a divalent metal salt, an ammonium salt, and an organic amine salt of the acids thereof; and mixtures thereof.

4. The separator coating composition as claimed in claim 1, wherein the crosslinking reactive group includes at least one selected from an isocyanate group, a hydroxyl group, and an oxazoline group.

5. The separator coating composition as claimed in claim 1, wherein the poly(vinylamide)-based copolymer includes the repeating unit derived from the vinylamide monomer and the repeating unit derived from the crosslinking reactive group-containing monomer, and the repeating unit derived from the vinylamide monomer includes a repeating unit derived from vinylpyrrolidone, and the repeating unit derived from the crosslinking reactive group-containing monomer includes a repeating unit derived from (meth) acrylic acid.

6. The separator coating composition as claimed in claim 1, wherein in the poly(vinylamide)-based copolymer, an amount of the repeating unit derived from the crosslinking reactive group-containing monomer is greater than 0 mol % and less than 50 mol %, based on a total number of moles of monomer components constituting the poly (vinylamide)-based copolymer.

7. The separator coating composition as claimed in claim 1, wherein an amount of the poly (vinylamide)-based copolymer is about 10 wt % to 100 wt %, based on a total weight of the binder.

8. The separator coating composition as claimed in claim 1, wherein an amount of the multifunctional crosslinking agent is in a range of about 1 part by weight to about 45 parts by weight, based on 100 parts by weight of the poly (vinylamide)-based copolymer.

9. The separator coating composition as claimed in claim 1, wherein the inorganic particles include at least one selected from boehmite, alumina, aluminum oxyhydroxide (AlOOH), zirconia, yttria, ceria, magnesia, titania, silica, aluminum carbide, titanium carbide, tungsten carbide, boron nitride, aluminum nitride, calcium carbonate, barium sulfate, aluminum hydroxide, and magnesium hydroxide.

10. A separator, comprising:
    a porous substrate; and
    a coating layer on one surface or opposite surfaces of the porous substrate, the coating layer including a dried cross-linked product of the separator coating composition as claimed in claim 1.

11. The separator as claimed in claim 10, wherein a thermal contraction rate of the separator is 5% or less in a temperature range of about 50° C. to about 150° C.

12. The separator as claimed in claim 10, wherein a thickness of the coating layer is in a range of about 0.5 μm to about 4 μm.

13. The separator as claimed in claim 10, wherein:
    the coating layer includes:
        the binder including a polymer in which the aqueous crosslinking reactive poly(vinylamide)-based copolymer is cross-linked; and
        the inorganic particles, and
        the polymer has a network structure formed by crosslinking the crosslinking reactive group included in the poly(vinylamide)-based copolymer by using the multifunctional crosslinking agent.

14. A lithium battery comprising the separator according to claim 10.

15. A method of manufacturing a separator, the method comprising:
    coating the separator coating composition according to claim 1 on one surface or opposite surfaces of a porous substrate; and
    drying, with air having a temperature of 30° C. to 80° C., the porous substrate on which the composition is coated, to obtain a separator in which a coating layer is disposed on the porous substrate.

* * * * *